United States Patent
Naganuma et al.

(10) Patent No.: US 12,287,615 B2
(45) Date of Patent: Apr. 29, 2025

(54) NUMERICAL CONTROL DEVICE FOR MACHINE TOOL

(71) Applicant: FANUC CORPORATION, Yamanashi (JP)

(72) Inventors: Keisuke Naganuma, Yamanashi (JP); Kazuhiro Hirauchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 316 days.

(21) Appl. No.: 17/799,710

(22) PCT Filed: Feb. 18, 2021

(86) PCT No.: PCT/JP2021/006168
§ 371 (c)(1),
(2) Date: Aug. 15, 2022

(87) PCT Pub. No.: WO2021/167013
PCT Pub. Date: Aug. 26, 2021

(65) Prior Publication Data
US 2023/0064012 A1 Mar. 2, 2023

(30) Foreign Application Priority Data
Feb. 20, 2020 (JP) ................................ 2020-027175

(51) Int. Cl.
*G05B 19/404* (2006.01)
*G05B 19/4065* (2006.01)

(52) U.S. Cl.
CPC ....... *G05B 19/404* (2013.01); *G05B 19/4065* (2013.01); *G05B 2219/49303* (2013.01)

(58) Field of Classification Search
None
See application file for complete search history.

(56) References Cited

U.S. PATENT DOCUMENTS 5,219,264 A * 6/1993 McClure ............... G06T 1/0014
414/730
8,781,982 B1 * 7/2014 Das ........................ G06N 3/084
706/21

(Continued)

FOREIGN PATENT DOCUMENTS

| CN | 109877649 A | 6/2019 |
| JP | 1-92052 | 4/1989 |

(Continued)

OTHER PUBLICATIONS

International Search Report issued Apr. 27, 2021 in corresponding International Application No. PCT/JP2021/006168.

*Primary Examiner* — Jason Lin
(74) *Attorney, Agent, or Firm* — Wenderoth, Lind & Ponack, L.L.P.

(57) ABSTRACT

The present invention is to allow for an automatic correction of an offset amount of a tool used in actual workpiece processing at an appropriate timing. The present invention provides a numerical control device for a machine tool including: an execution unit for executing a processing program; a storage unit for storing, for each tool used in each processing program, a wear amount of the each tool when executing the processing program, as a tool offset amount; a monitoring unit for monitoring the timing of the work processing end or work processing start; and a changing unit for changing, for each processing program, the present tool offset amount at the timing of the work processing end or work processing start monitored by the monitoring unit, on the basis of the tool offset amount of the processing program stored in the storage unit.

3 Claims, 6 Drawing Sheets

(56) References Cited

U.S. PATENT DOCUMENTS

| | | | |
|---|---|---|---|
| 9,508,042 B2 * | 11/2016 | Yang | G06N 5/04 |
| 10,139,311 B2 * | 11/2018 | Liao | G01M 13/00 |
| 2006/0276934 A1 * | 12/2006 | Nihei | B25J 9/1679 |
| | | | 700/245 |
| 2009/0099684 A1 | 4/2009 | Roders | |
| 2012/0238184 A1 | 9/2012 | Schwägerl | |
| 2017/0057039 A1 * | 3/2017 | Nakayama | B23Q 17/0995 |

FOREIGN PATENT DOCUMENTS

| | | |
|---|---|---|
| JP | 3-73253 | 3/1991 |
| JP | 3-234443 | 10/1991 |
| JP | 5-108123 | 4/1993 |
| JP | 2002-307263 | 10/2002 |
| JP | 2006-309304 | 11/2006 |

* cited by examiner

NUMERICAL CONTROL DEVICE FOR MACHINE TOOL

TECHNICAL FIELD

The present invention relates to a numerical controller for a machine tool.

BACKGROUND ART

Conventionally, machining of mass-produced parts has been performed using a machine tool equipped with a numerical controller. Since the machining of the mass-produced parts is repeated, tools are worn and machine accuracy is reduced.

Therefore, in a technique disclosed in Japanese Unexamined Patent Application, Publication No. 2006-309304, a wear period is divided into three periods including an initial wear generation period in which a tool wear amount per machining is larger than a first reference value Q1, an intermediate wear generation period in which the tool wear amount per machining is smaller than the first reference value Q1 and larger than a second reference value Q2 (Q2<Q1), and a stable period in which the tool wear amount per machining is smaller than the second reference value Q2, a compensation interval and a compensation amount of a tool position are set in response to the tool wear amount in each of the periods, and the tool position is compensated based on the setting to proceed with the machining. At this time, an operator manually Compensates the tool position.

Further, there is known a technique of changing an offset amount corresponding to a tool wear amount from a screen during execution of a machining program. In particular, in an automatic board, in order to increase productivity, the operator may input the tool wear amount on a display screen without stopping the machining of the workpiece. In this case, the tool wear amount to be input is estimated from a dimension of the machined workpiece. Further, there is also known a technique of estimating the tool wear amount from a cutting time and the number of times of use of the tool.
Patent Document 1: Japanese Unexamined Patent Application, Publication No. 2006-309304

DISCLOSURE OF THE INVENTION

Problems to be Solved by the Invention

However, there are the following problems (1) to (5) in the conventional techniques.

(1) When the tool offset amount is changed manually, the tool offset amount may be changed during machining, and which may cause defective parts. Specifically, when the tool offset amount is changed during the machining, an inappropriate step may occur in the workpiece.

(2) The technique of estimating the tool wear amount based on the cutting time and the number of times of use of the tool has been proposed, but since the tool wear amount also changes depending on a tool path drawing and a method of use (roughing and finishing), it is necessary to estimate the tool wear amount for each machining program.

(3) Since an offset compensation process of the wear amount for the used tool is calculated using a preset estimated value, it does not exactly match the wear amount of the tool that actually wears during the workpiece machining, and the machined workpiece may become a defective workpiece.

(4) When the operator manually changes the tool offset amount during machining work, if the number of tools used is large, the operator may make a mistake in the tool itself for which the tool offset amount should be changed.

(5) Further, in an environment where the workpiece machining is continuously executed without stopping in the middle of the workpiece machining, a control for a user to change the offset of the tool used in the workpiece machining by stopping the workpiece machining itself causes reduction in productivity of parts machining, which is not realistic.

For this reason, it is desirable that the offset amount of the tool used in the actual workpiece machining can be automatically compensated at an appropriate timing when the workpiece machining is executed.

Means for Solving the Problems

A numerical controller for a machine tool according to the present disclosure includes: an executing unit that executes a machining program; a storing unit that stores, for each tool used in each machining program, a wear amount of each tool when executing the machining program, as a tool offset amount; a monitoring unit that monitors a timing of a machining end or a machining start of a workpiece; and a changing unit that changes, for each machining program, a current tool offset amount based on the tool offset amount of the machining program stored in the storing unit at the timing of the machining end of the machining start of the workpiece which is monitored by the monitoring unit.

Effects of the Invention

According to an aspect of the present disclosure, it is possible to automatically compensate the offset amount of the tool used in the actual workpiece machining at an appropriate timing.

PREFERRED MODE FOR CARRYING OUT THE INVENTION

Hereinafter, embodiments will be described with reference to the drawings.

FIRST EMBODIMENT

Figure 1:
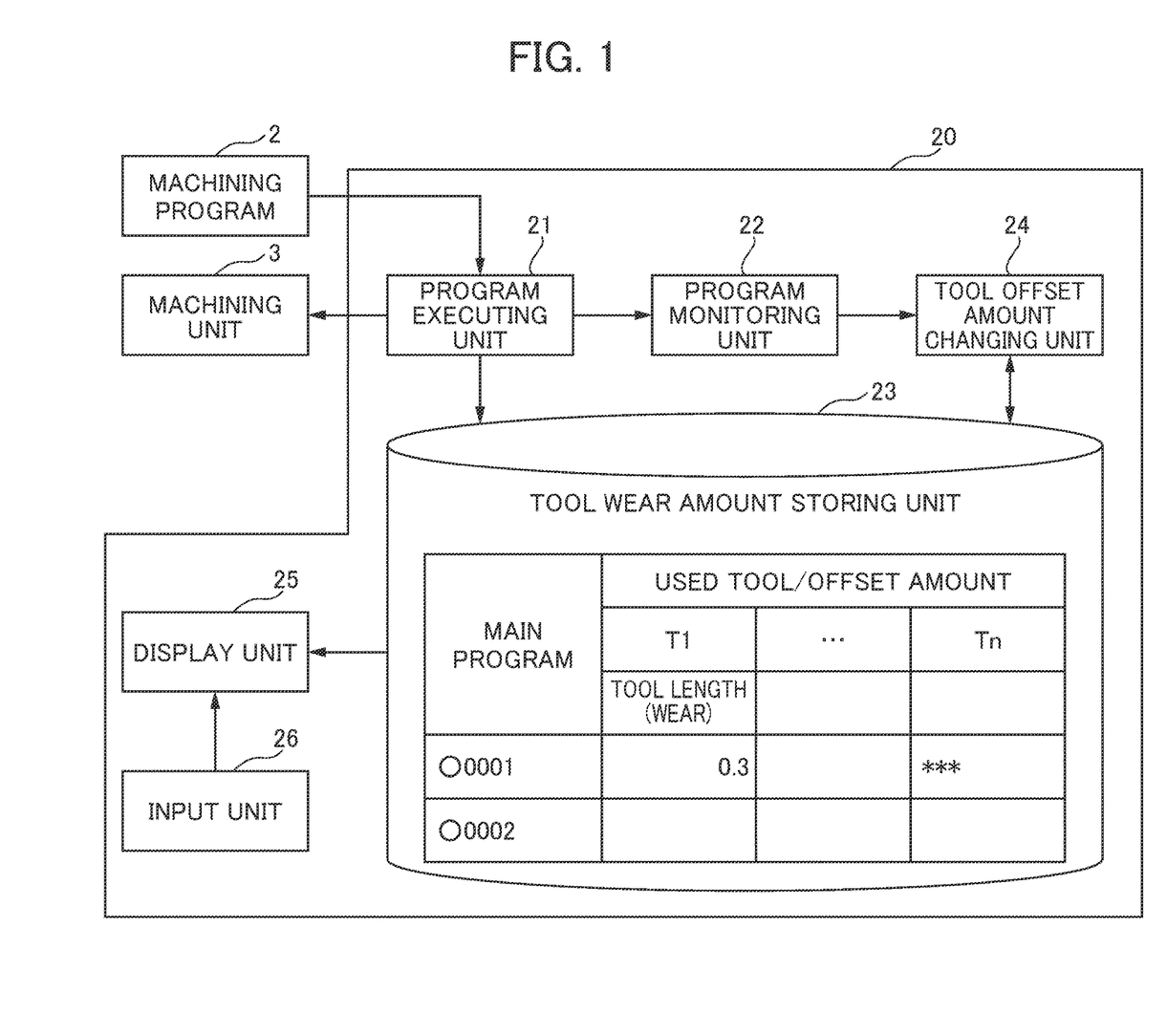
FIG. 1 is a block diagram showing hardware of a numerical controller for a machine tool.

FIG. 1 is a block diagram showing hardware of a numerical controller (CNC) for a machine tool according to the present embodiment. In FIG. 1, a numerical controller (CNC) 20 for processing a machining program 2 includes a program executing unit 21 as an executing unit, a program monitoring unit 22 as a monitoring unit, a tool wear amount storing unit 23 as a storing unit, a tool offset amount changing unit 24 as a changing unit, a display unit 25, and an input unit 26.

Here, before machining of a workpiece, a user sets and manages each tool wear amount (a wear amount of a tool measured from the input unit 26 for each program and a wear amount or each of a plurality of tools (11 to TN) used at the time of machining of one workpiece) as an offset amount in the tool wear amount storing unit 23.

Thus, as shown in FIG. 1, a table is created in the tool wear amount storing unit 23 to manage an offset amount. Even with the same tool, the wear amount to be initially set may differ depending on a machining program.

The program executing unit 21 controls a machining path of a machining tool according to the machining program to be input. Here, a machining unit (not shown) moves the tool selected according to the program executing unit 21 along the machining path, and performs a machining process on a workpiece set on a workpiece table.

The program monitoring unit 22 as the monitoring unit monitors, according to the machining program to be executed by the program executing unit 21, a timing at which the machining unit set with any of tools performs machining on the workpiece, for example, a timing at which the machining of the workpiece ends or a timing at which the machining of the workpiece starts.

The tool offset amount changing unit 24 automatically changes, for each machining program, a current tool offset amount based on the tool offset amount of the machining program stored in the tool wear amount storing unit 23 at the timing of the end of machining or the start of machining of the workpiece which is monitored by the program monitoring unit 22.

The display unit 25 displays a management screen (a program management screen 25A shown in FIG. 2) for displaying a list of tools used by executing one machining program and tools not used or a program management screen (a program management screen 25B shown in FIG. 2) in which only a tool used during execution of one machining program is extracted. The program management screen displayed on the display unit 25 shows an example of displaying a tool name, a compensation number, a shape, and a wear X-axis.

Figure 2:
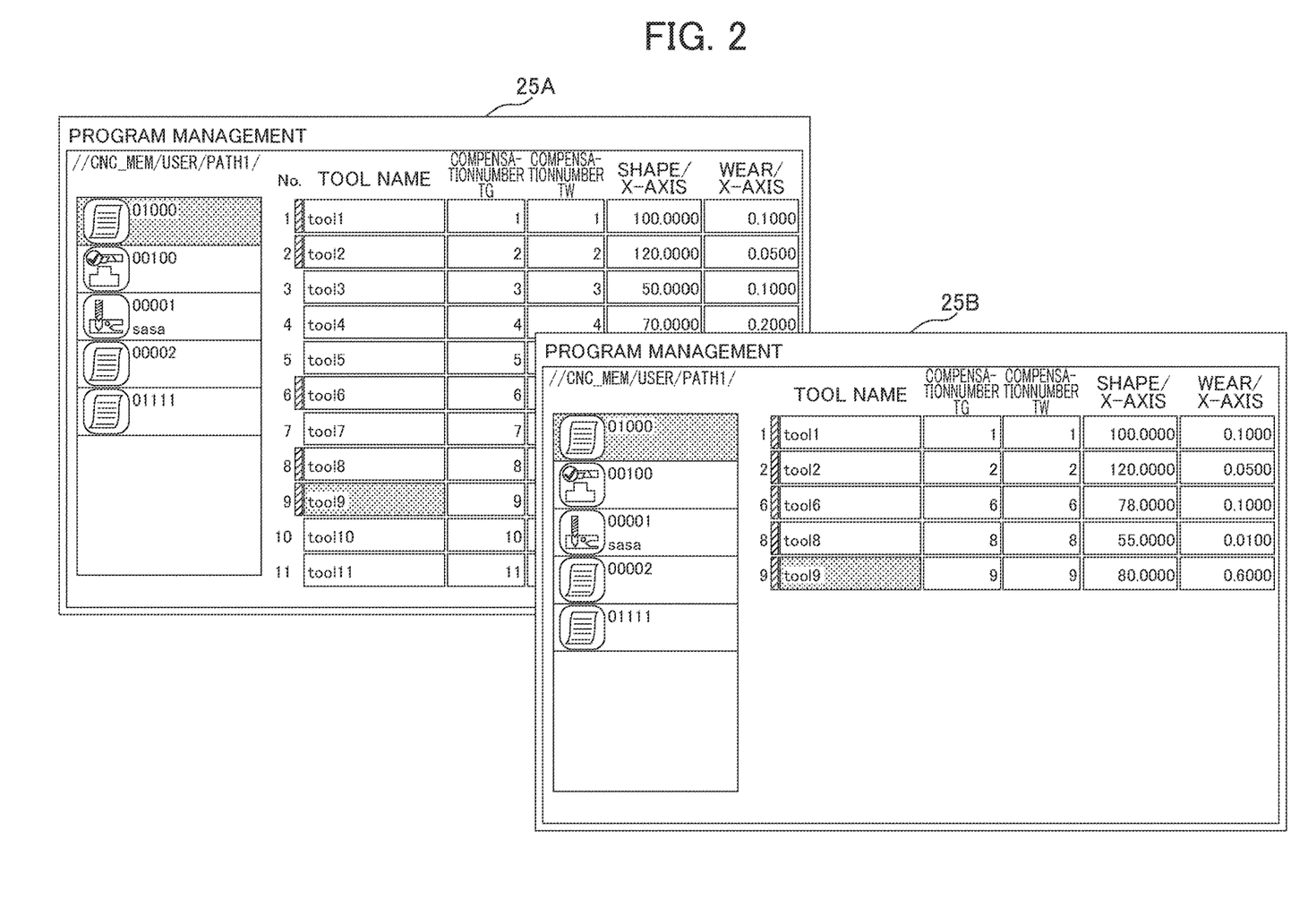
FIG. 2 is a diagram showing an example of a program management screen displayed on a display unit.

FIG. 2 is a diagram showing an example of a program management screen displayed on the display unit 25 shown in FIG. 1. The display screen of this example is an example, and a list format used is not limited to this embodiment.

In FIG. 2, the program management screen 25A corresponds to a state in which a machining program currently selected is "01000" and management information corresponding to tool numbers NO. 1 to NO. 11 having consecutive tool names are displayed in a list. The program management screen 25A is an example in which the management information of the tool numbers not used in the workpiece machining and the management information of the tool numbers of the tools used in the workpiece machining are displayed in a list at the same time. For this reason, the user may misidentify the tool number, for which an offset value should be set, among the tools used in the workpiece machining. In the present embodiment, the display unit 25 can also display the program management screen 25B instead of the program management screen 25A. The program management screen 25B is an example in which only the tools used for each program are extracted from the tool numbers NO. 1 to NO. 11 and are highlighted on the display unit 25.

On the current program management screen 25B, only the tools with tool numbers NO. 1, NO. 2, NO. 6, NO. 8, and NO. 9 are extracted as tools used for machining and are highlighted in a list format in association with each machining program.

The highlighting example in the present embodiment is to make the tool number easier for an operator to see and is an example in which a display color of a cell of the tool number is displayed differently from a display color of the other cell to improve visibility of the operator. The form of the highlighting itself (indicated by diagonal lines in the drawing) is not limited to this example.

Figure 3:
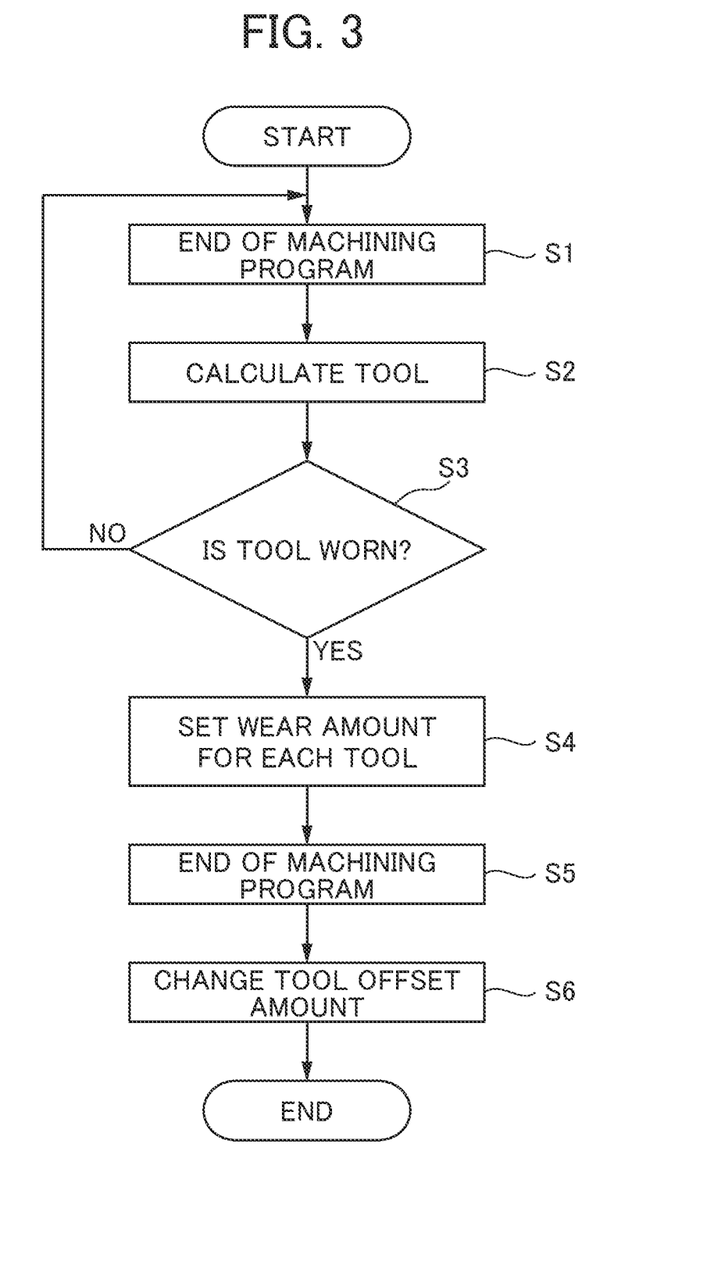
FIG. 3 is a flowchart showing a control procedure of the numerical controller for a machine tool.

FIG. 3 is a flowchart showing a control procedure of the numerical controller (CNC) for the machine tool according to the present embodiment. This example is an example of automatically changing the current tool offset amount based on the tool offset amount of the machining program stored in the tool wear amount storing unit 23.

Note that S1 to S6 indicate respective steps, and are realized by the numerical controller (CNC) 20 that reads and executes the control program stored in a programmable storing unit (EEPROM). In the present embodiment, the case has been described in which the offset amount of the tool is changed by grasping the timing at which the machining program ends, but it may be executed at the timing at which the machining program starts. Further, the timing of changing the offset amount is not limited to the timing of starting or ending the machining program as long as it is a non-cutting block that does not use a tool during the machining program.

The program monitoring unit 22 detects the end of one machining program started by the program executing unit 21 after receiving a machining process start instruction from the user (S1). Next, the program executing unit 21 calculates only the tools whose offset amount should be changed among the tools used in the machining program executed in Step S1 (S2).

Next, the tool offset amount changing unit 24 determines whether the used tools are worn (S3), the process returns to Step S1 when it is determined that none of the tools is worn, and the process proceeds to Step S4 when any of the tools is Worn. Normally, it is determined that the tools used for the workpiece machining are worn (excluding measurement tools).

Next, the tool wear amount is set in the tool wear amount storing unit 23 from the input unit 26 (S4). Thereby, as shown in FIG. 1, the table is created in the tool wear amount storing unit 23 to manage the offset amount. Next, the program executing unit 21 executes the machining program and ends the machining program (S5). Next, the tool offset amount changing unit 24 changes the current tool offset amount based on the tool offset amount stored in the tool wear amount storing unit 23 (S6), and then this process ends.

In Step S4, the wear amount set by the input unit 26 may be the wear amount of the tool itself, or may be a change amount (difference amount) from the value that is previously measured.

Effects of First Embodiment

According to the present embodiment, it is possible to automatically change the offset value of the tool used in the actual workpiece machining at an appropriate timing.

Further, since the list of tools used for the workpiece machining is displayed on the program management screen, it is possible to prevent the user from mistakenly selecting the tool for which the offset amount should be set and changing the offset value of the unintended tool.

SECOND EMBODIMENT

The example has been described in the above embodiment in which the offset amount of the tool used is automatically changed for each program by grasping the start or end timing of the machining program. However, the timing for changing the offset amount of the used tool for each program may be constituted to change the offset amount of the tool for each program according to the progress state of work man-hours for actually machining the workpiece. Hereinafter, such an embodiment will be described in detail.

Figure 4:
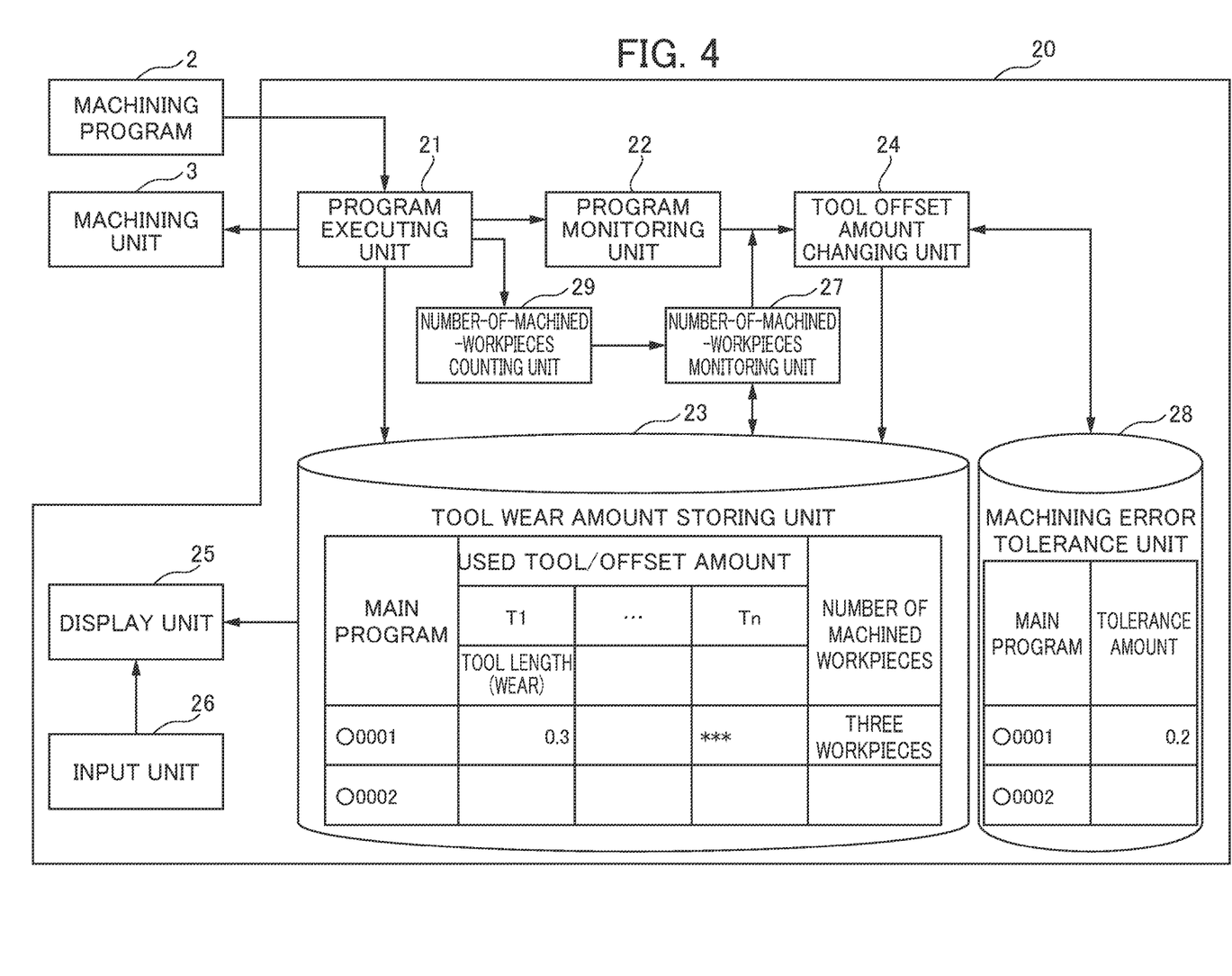
FIG. 4 is a block diagram showing hardware of a numerical controller for a machine tool.

FIG. 4 is a block diagram showing hardware of a numerical controller (CNC) for a machine tool according to the present embodiment. The same components as those in FIG. 1 are denoted by the same reference numerals and will not be described. In the present embodiment, the tool offset amount changing unit 24 changes, based on the offset amount of the tool stored in the tool wear amount storing unit 23, the current tool offset amount when an estimated wear amount calculated using the number of machined workpieces monitored by a number-of-machined-workpieces monitoring unit 27 and the wear amount of the tool stored in the tool wear amount storing unit 23 exceeds a tolerance amount stored in a machining error tolerance unit 28. In FIG. 4, a number-of-machined-workpieces counting unit 29 as a counting unit counts a value indicating how many workpieces have been machined by the machining program started by the program executing unit 21 as the executing unit. The number-of-machined-workpieces monitoring unit 27 as a setting unit monitors a count number counted by the number-of-machined-workpieces counting unit 29, and sets and manages the number of machined workpieces in the tool wear amount storing unit 23.

Further, the machining error tolerance unit 28 as a storing unit stores a tolerance amount of each tool, which is referred to by the tool offset amount changing unit 24, for each program in association with a main program. Here, the tolerance amount is a parameter that defines machine accuracy, and is numerical data that manages an allowable range of machining error of the workpiece. The machining error tolerance unit 28 and the tool wear amount storing unit 23 may be constituted by the same storage medium.

The tool wear amount storing unit 23 stores the wear amount for each tool used in the machining program 2 and the number of machined workpieces each time the program executing unit 21 executes the machining program 2 once. Here, the number of machined workpieces is set in the tool wear amount storing unit 23 by the number-of-machined-workpieces monitoring unit 27.

When one workpiece machining is completed, the tool offset amount changing unit 24 compares the estimated wear amount calculated at the timing when the next workpiece machining is completed with the tolerance amount stored in the machining error tolerance unit 28, and automatically changes the offset amount of the current tool based on the offset value of the corresponding tool stored in the tool wear amount storing unit 23 when it is determined that the calculated estimated wear amount exceeds the tolerance amount. The estimated wear amount is calculated by the product of the wear amount stored in the tool wear amount storing unit 23 and the number of machined workpieces.

Numerical Example to Change Offset Amount

FIG. 4 exemplifies a case in which the machining error tolerance unit 28 stores the tolerance amount as 0.2 in association with each machining program and the tool wear amount storing unit 23 stores the number of machined workpieces being 3 and a tool length T1 of wear being 0.3 mm for each machining program.

The tool offset amount changing unit 24 performs the following calculation assuming that the estimated wear amount per workpiece is 0.1 (1×0.1) mm with the number of machined workpieces being 3 and the tool length T1 being 0.3 mm stored in the tool wear amount storing unit 23.

When the number-of-machined-workpieces counting unit 29 counts up a count value to "1" by execution of first workpiece machining, the tool wear amount is (0.1+0.1), which does not exceed the tolerance amount of 0.2 stored in the machining error tolerance unit 28, even when the machining unit 3 performs the next workpiece machining.

However, when the next workpiece machining is ended, the count value of the number-of-machined-workpieces counting unit 29 changes to "2", the tool wear amount becomes 0.1 (2×0.1) mm, and the estimated wear amount at the timing of ending the next workpiece machining becomes 0.3 (=0.2 (2×0.1) mm+0.1), which exceeds 0.2 mm of the tolerance amount stored in the machining error tolerance unit 28 (S26 shown in FIG. 5 to be described below), whereby it is determined to be a problem.

Therefore, the tool offset amount changing unit 24 automatically changes the current tool offset amount based on the offset amount of the tool used for the workpiece machining stored in the tool wear amount storing unit 23 so as not to exceed the tolerance amount.

Thereby, it is possible to change the offset amount of the tool used for the next workpiece machining by the machining unit 3 at an optimum timing. Thus, it is possible to reduce occurrence of defective workpieces due to shifting of the timing of changing the offset value.

Figure 5:
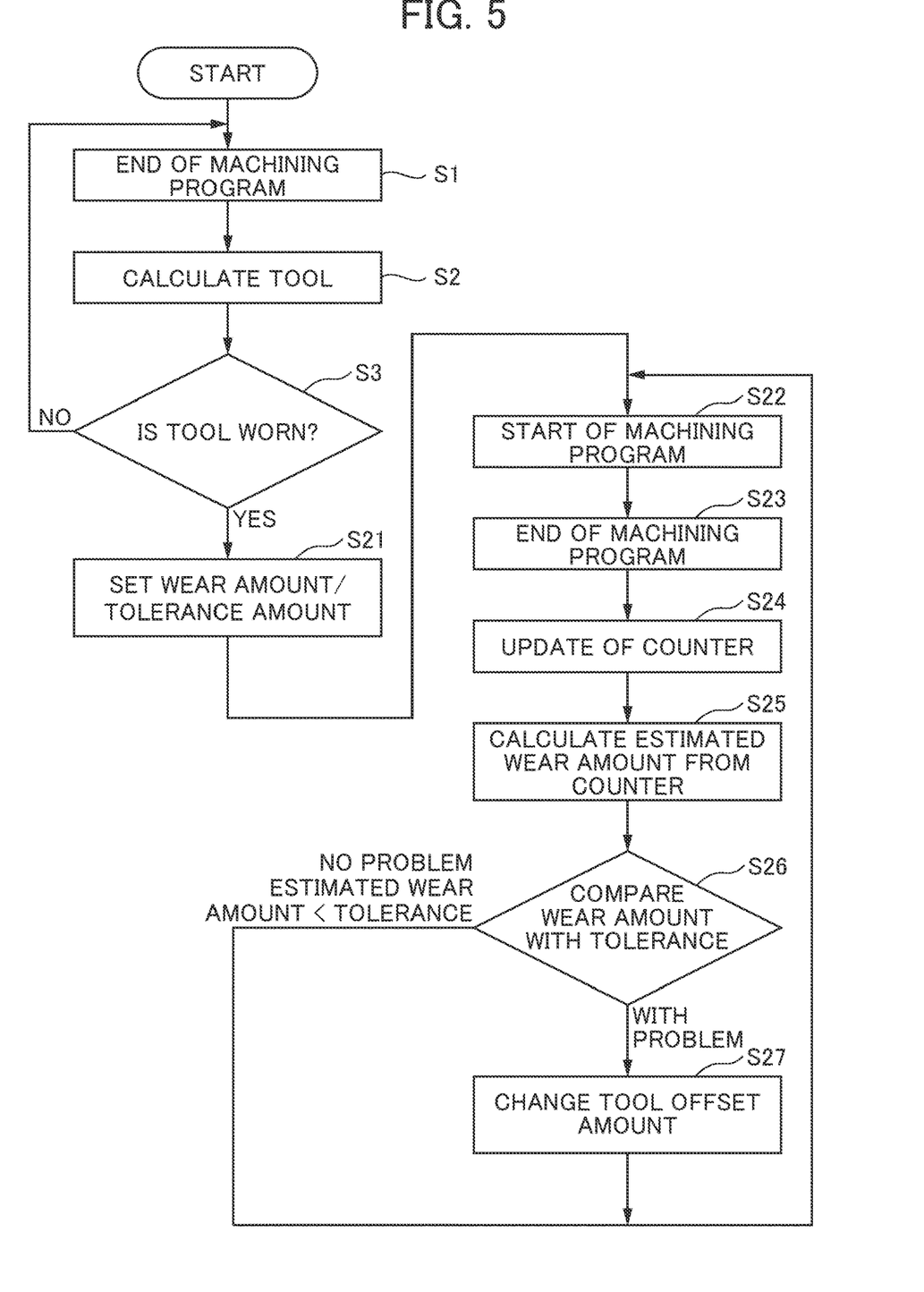
FIG. 5 is a flowchart showing a control procedure of the numerical controller for a machine tool.

FIG. 5 is a flowchart showing a control procedure of the numerical controller (CNC) for the machine tool according to the present embodiment. In this example, the wear estimation amount of each tool is calculated according to the progress state of work man-hours for actually machining the workpiece, and the offset amount of the tool used in each program stored by the tool wear amount storing unit 23 is automatically changed.

Note that Steps S1 to S3 are the same steps as those shown in FIG. 3, and Steps S21 to S26 indicate respective steps in the present embodiment. The respective steps are realized by the numerical controller (CNC) 20 that reads and executes the control program stored in a programmable storing unit (for example, EEPROM).

Steps S1 to S3 are executed, and the process transitions to Step S21 when it is determined in Step S3 that the used tool is worn. First, the tool wear amount is set in the tool wear amount storing unit 23, and the tolerance amount is set in the machining error tolerance unit 28 (S21).

Next, the program executing unit 21 starts the machining program 2 (S22), and ends the started machining program 2 (S23). At this time, when the number-of-machined-workpieces counting unit 29 counts the number of machined workpieces each time the workpiece machining is executed, the number-of-machined-workpieces monitoring unit 27 updates the number of machined workpieces stored in the tool wear amount storing unit 23 (S24).

Next, whenever the count value counted by the number-of-machined-workpieces counting unit 29 is added, the tool offset amount changing unit 24 calculates the estimated wear amount of the tool at the time when the next workpiece machining is ended, based on the number of machined workpieces and the tool wear amount set in the tool wear amount storing unit 23 (S25).

Next, the tool offset amount changing unit 24 compares the estimated wear amount of the tool calculated with the tolerance amount stored in the machining error tolerance unit 28 based on the number of machined workpieces and the tool wear amount, and then determines whether the calculated estimated wear amount exceeds the tolerance amount at the timing when the next workpiece machining is completed (S26). Here, when the tool offset amount changing unit 24 determines that the calculated estimated wear amount does not exceed the tolerance amount (there is no problem), the process returns to Step S22.

On the other hand, when the tool offset amount changing unit 24 determines in Step S26 that the calculated estimated wear amount exceeds the tolerance amount (there is a problem), the tool offset amount changing unit 24 automatically changes the current tool offset amount based on the offset value stored and managed in the tool wear amount storing unit 23, and the process returns to Step S22.

Thereby, it is possible to count the workpiece machining number every time the workpiece machining is actually started and ended, to calculate the estimated wear amount at which the tool is worn in the next workpiece machining after the current workpiece machining is ended, and to automatically change the current tool offset amount based on the stored tool offset amount at the timing of determining that the calculated estimated wear amount exceeds the stored tolerance amount of the tool being used.

Effect of Second Embodiment

According to the present embodiment, every time the series of workpiece machining starts and ends, the machining error of the tool used in the series of workpiece machining to be started next can be kept constant.

THIRD EMBODIMENT

The case has been described in the above embodiment in which the offset amount of the tool used for the workpiece machining is changed every time a series of workpiece machining starts and ends.

Figure 6:
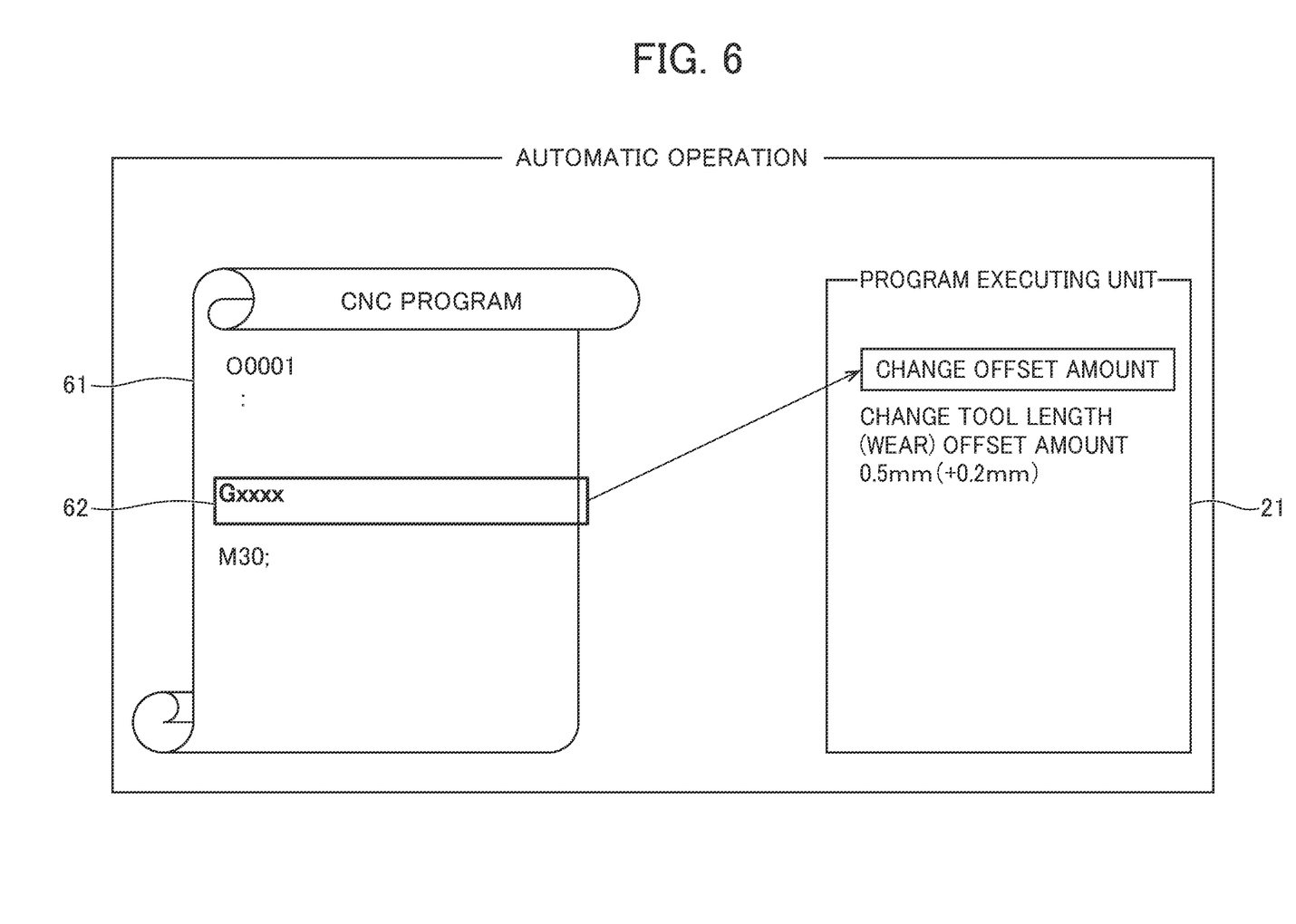
FIG. 6 is a diagram showing an example of an instruction code for compensating an offset amount of a tool used in workpiece machining.

However, the timing for changing the offset amount of the tool used for the workpiece machining may be constituted to be executed at an arbitrary timing specified by the user in the machining programs. Here, the arbitrary timing may be any timing at which the tool is not used during the machining program, FIG. 6 is a diagram showing an example of an instruction code for compensating an offset amount of a tool used in workpiece machining. In FIG. 6, a CNC program 61 is inserted with a command 62 to change the offset amount at the timing when machining program is executed a specified number of times. The program executing unit 21 shown in FIG. 1 executes the CNC program 61 to execute a command to change the offset amount when a value of a program counter advances to a position corresponding to a code for setting the offset amount, for example, a code "Gxxxx". In response to this, the tool offset amount changing unit 24 automatically changes the current tool offset amount based on the tool offset amount stored in the tool wear amount storing unit 23.

Effect of Third Embodiment

According to the present embodiment, when the command (for example, the code "Gxxxx") to change the offset amount of the used tool is inserted into the CNC program 61, it is possible to automatically change the offset amount of the tool used in the workpiece machining at the timing specified by the user.

The present disclosure is not limited to the above embodiments, and the present disclosure includes modifications and improvements within the range in which the object of the present disclosure can be achieved.

20 numerical controller
21 program executing unit (executing unit)
22 program monitoring unit (monitoring unit)
23 tool wear amount storing unit (storing unit)
24 tool offset amount changing unit (changing unit)
25 display unit
26 input unit
27 number-of-machined-workpieces monitoring unit (setting unit)
28 machining error tolerance unit (storing unit)
29 number-of-machined-workpieces counting unit (counting unit)

The invention claimed is:

1. A numerical controller for a machine tool, comprising:
a processor that executes a machining program;
memory storing a program and that stores, for each tool used in each machining program, a wear amount of each tool when executing the machining program, as a tool offset amount;
wherein, when the program is executed by the processor, the program causes the processor to execute:
monitoring a timing of a machining end or a machining start of a workpiece; and
automatically changing, for each machining program, a current tool offset amount based on the tool offset amount of the machining program stored in the memory at the timing of the machining end or the machining start of the workpiece which is monitored,
wherein the memory stores, for each tool used, the wear amount, the tool offset amount, and a tolerance amount indicating a machining error of the tool in association with each machining program;
counting a number of machined workpieces, and
setting the number of machined workpieces counted in the memory, and
the automatically changing automatically changes the current tool offset amount based on the tool offset amount stored in the memory when an estimated wear amount calculated using the tool wear amount set in the memory and the number of machined workpieces exceeds the tolerance amount;
wherein the changed current tool offset amount is used to adjust respective tool positions.

2. The numerical controller for a machine tool according to claim 1, wherein the machining program is set with a code for specifying a timing for changing the tool offset amount.

3. The numerical controller for a machine tool according to claim 1, further comprising a display that extracts and displays each tool used for each machining program.

* * * * *